United States Patent [19]

Tago

[11] Patent Number: 4,470,137
[45] Date of Patent: Sep. 4, 1984

[54] APPARATUS FOR ROTATABLY SUPPORTING A RECORDING MEMBER

[75] Inventor: Yoshiaki Tago, Yokohama, Japan

[73] Assignee: Tokyo Shibaura Denki Kabushiki Kaisha, Japan

[21] Appl. No.: 313,225

[22] Filed: Oct. 20, 1981

[30] Foreign Application Priority Data

Nov. 17, 1980 [JP] Japan .................. 55-161679

[51] Int. Cl.$^3$ .................. G11B 7/24; G11B 23/14
[52] U.S. Cl. .................. 369/100; 346/137; 369/270; 369/290
[58] Field of Search .............. 369/275, 100, 270, 282, 369/290, 77, 111, 63, 77.1, 77.2; 358/342; 346/135.1, 137

[56] References Cited

U.S. PATENT DOCUMENTS

| | | | |
|---|---|---|---|
| 1,150,020 | 8/1915 | Ettlinger | 369/282 |
| 1,846,378 | 2/1932 | Acheson | 369/282 |
| 2,949,307 | 8/1960 | Mueller | 369/290 X |
| 3,815,146 | 6/1974 | Nash | 346/137 |
| 3,934,080 | 1/1976 | Janssen | 369/111 |
| 4,060,248 | 11/1977 | Lakerveld et al. | |
| 4,074,282 | 2/1978 | Balas, Jr. et al. | 346/135.1 |
| 4,111,430 | 9/1978 | Johnson | 369/63 |
| 4,165,519 | 8/1979 | Goto | |
| 4,264,911 | 4/1981 | Wilkinson | 346/135.1 |
| 4,298,976 | 11/1981 | Irvin et al. | 369/282 |
| 4,351,047 | 9/1982 | Redlich et al. | |

FOREIGN PATENT DOCUMENTS 26475 9/1980 European Pat. Off. .
30754 12/1980 European Pat. Off. .

Primary Examiner—Donald E. McElheny, Jr.
Attorney, Agent, or Firm—Banner, Birch, McKie & Beckett

[57] ABSTRACT

In the recording and/or reproducing device according to the present invention, a disc unit (i.e., recording member) is utilized which comprises upper and lower spaced centrally apertured recording portions. Each recording portion is provided with an annular recording layer on its inner surface and an aperture at its center for rotatably mounting on a turntable. Upon rotating the turntable with the disc unit, the recording and reproducing device records information signals on, and reads information signals from, the recording layer on each recording portion by using a light beam. The light beam is positioned to strike only the recording layer on the lower recording portion. When the disc unit is turned on its other side, the previously positioned upper unit is then positioned as the lower unit to receive the light beam. The turntable comprises a perpendicularly orientated centering member which engages the aperture of a recording portion. The centering member centers the disc unit on the turntable. The centering member has a length such that it enters the aperture in the lower recording portion but does not protrude into the aperture in the upper recording portion.

9 Claims, 8 Drawing Figures

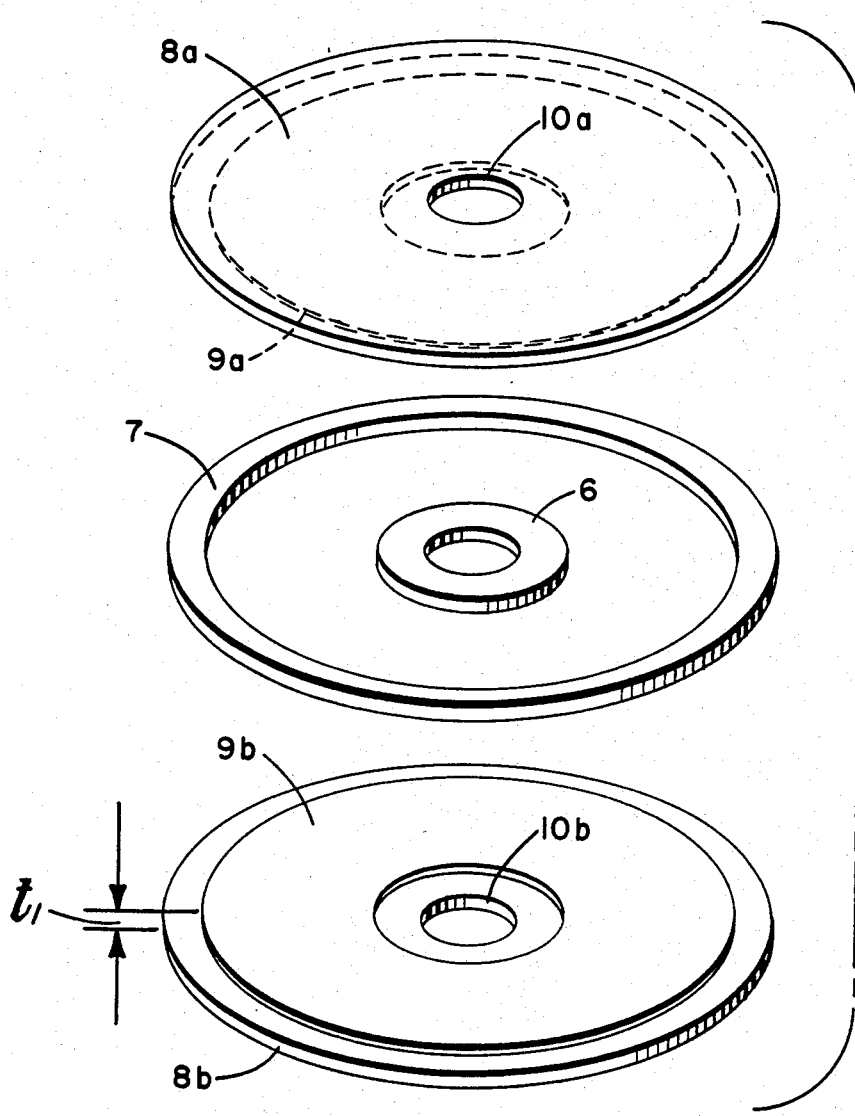
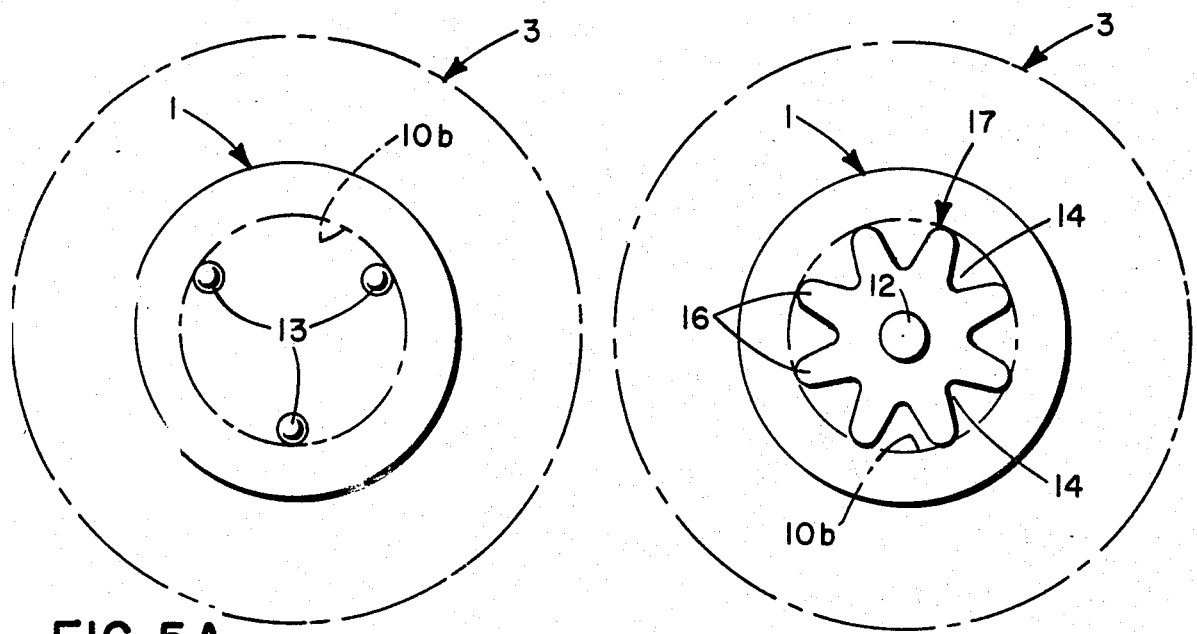
FIG. 4
FIG. 5A  FIG. 6A

APPARATUS FOR ROTATABLY SUPPORTING A RECORDING MEMBER

BACKGROUND OF THE INVENTION

This invention relates to a recording and/or reproducing device having a recording member for storing and filing information. In particular, the invention is directed to an apparatus for rotatably supporting a recording member.

Such recording and/or reproducing devices are constructed of a turntable for receiving and supporting a recording member. A light beam is utilized to record and reproduce information (e.g., video) on the recording member. Recently, there has been a demand for increasing the information storage capacity on the recording member. To meet this demand, disc units having the capability of recording information on, and reproducing information from, both sides of the recording member have been developed. As shown in U.S. Pat. No. 4,074,282, for example, a disc unit having two spaced and centrally apertured recording portions are utilized. Each recording portion is provided with a recording layer on its inner surface. The disc unit is loaded onto a turntable which rotatably supports the disc unit. The turntable includes a perpendicularly orientated centering member which protrudes through the apertures of both recording portions. The construction of the disc unit and its position on the turntable permits recording and reproducing information on the recording layer on each side of the recording member.

It is essential when utilizing this kind of disc unit for recording and reproduction that it be correctly and precisely positioned on the turntable. The recording surface of the recording member must be substantially parallel to the surface of the turntable. This is very important during reproduction of the information since the light beam which detects the information must correctly and precisely contact the areas of the recording member where the desired information is located. Any tilting of the recording member with respect to the turntable will cause defective reproduction and recording. Therefore, the aperture in each recording portion must coincide with the centering member on the turntable. Consequently, it is necessary to precisely align the apertures in the two recording portions in order that the surface of the disc unit is positioned substantially parallel to the surface of the turntable.

In practice, however, due to errors which arise during production of the disc unit, it is not possible to precisely align the apertures. As a result, it is impossible, in many cases, to load the disc unit onto the turntable due to mismatching of these apertures. Further, tilting of the recording member will occur with respect to the turntable due to this misalignment. Such misalignment will prevent accurate reproduction and recording.

SUMMARY OF THE INVENTION

It is an object of the invention to overcome the prior art disadvantages mentioned above. The invention provides a recording and/or reproducing device incorporating an apparatus for rotatably supporting a disc unit wherein the disc unit can be correctly and precisely positioned on a turntable.

Another object of the invention is to provide a recording and/or reproducing device wherein accurate reproduction and recording on a recording member is possible despite some misalignment between the apertures in each recording portion.

A further object of the invention is to permit loading of the disc unit onto the turntable despite mismatching between the apertures in each recording portion.

A still further object of the invention is to provide a recording and/or reproducing device which can utilize inexpensive disc units which have not been manufactured by time consuming and costly methods to achieve exact alignment of the apertures.

In the recording and/or reproducing device according to the present invention, a disc unit (i.e., recording member) is utilized which comprises upper and lower spaced centrally apertured recording portions. Each recording portion is provided with an annular recording layer on its inner surface and an aperture at its center for rotatably mounting on a turntable. Upon rotating the turntable, the recording and reproducing device records information signals on, and reads information signals from, the recording layer on each recording portion by using a light beam. The light beam is positioned to strike only the recording layer on the lower recording portion. When the disc unit is turned on its other side, the previously positioned upper unit is then positioned as the lower unit to receive the light beam. The turntable comprises a perpendicularly orientated centering member which engages the aperture on the lower recording portion. The centering member centers the disc unit on the turntable. The centering member has a length such that it enters the aperture in the lower recording portion but does not protrude into the aperture in the upper recording portion.

The centering member is designed to engage the aperture of only one in the recording portions. Therefore, the disc unit can be easily loaded onto the turntable despite any misalignment between the apertures in the recording portions. Therefore, any assembly errors in the manufacture of the unit disc will not prevent the centering member from precisely engaging the aperture of the lower unit. As a result, the unit which receives the light beam, the lower unit, is properly centered so that recording and reproduction accurately occurs. Other objects and features of this invention will be apparent from the following description read in connection with the accompanying drawings.

BRIEF DESCRIPTION OF THE DRAWINGS

FIG. 4 is an exploded perspective view of the disc unit shown in FIG. 3.

FIG. 5a is a plan view of another embodiment of the turntable and disc unit according to the present invention.

FIG. 5b is a perspective view of the turntable shown in FIG. 5a.

FIG. 6a is a plan view of the other embodiment of the turntable and disc unit according to the present invention.

FIG. 6b is a perspective view of the turntable shown in FIG. 6a.

DETAILED DESCRIPTION OF THE PREFERRED EMBODIMENT

Figure 1:
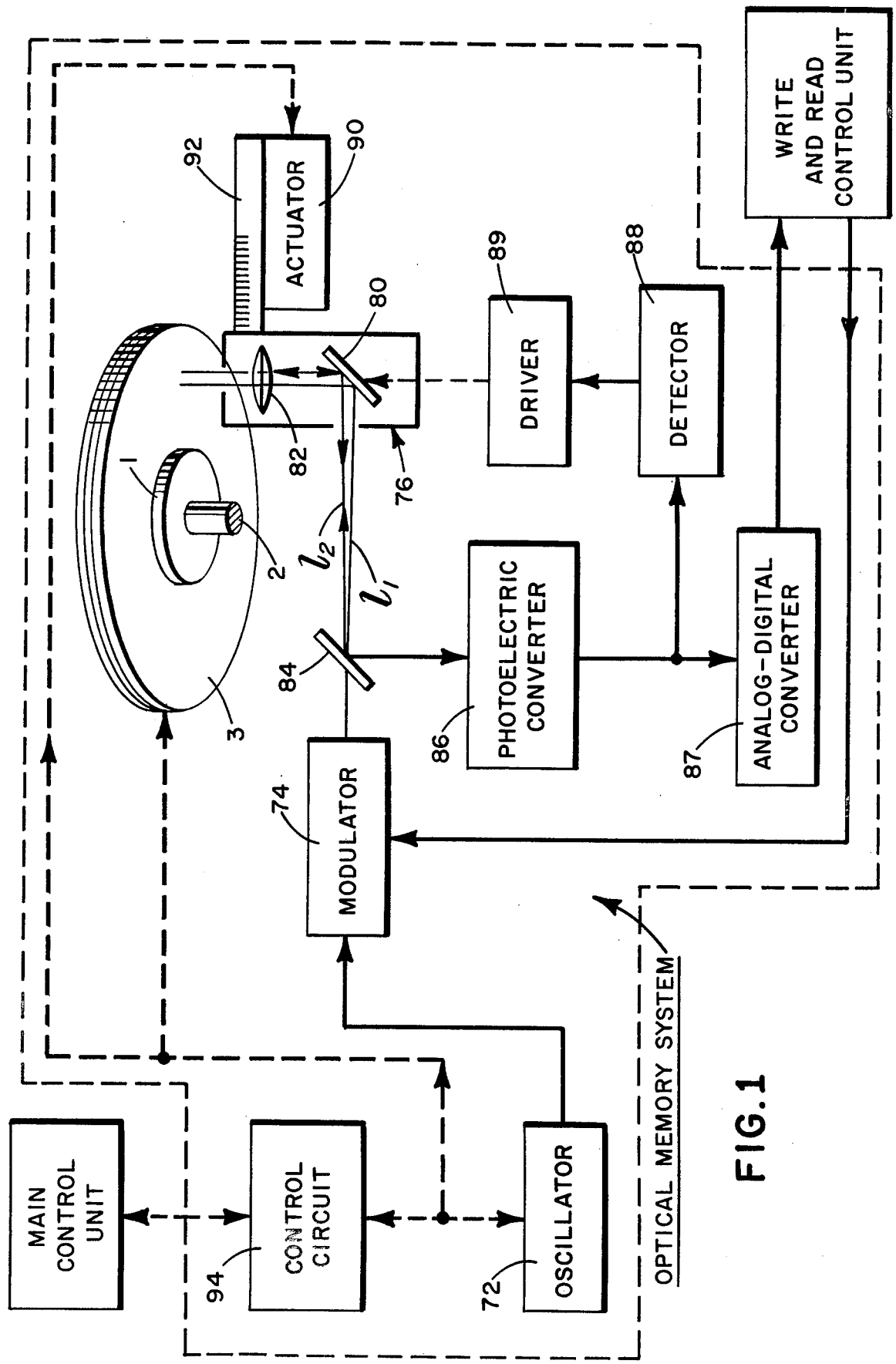
FIG. 1 is a diagram showing a recording and reproducing device according to the present invention.

FIG. 1 is a diagram of an optical memory system which reads and writes information using an optical recording member 3. Recording member 3 is rotated at a constant speed by a disc shaped turntable 1 which is rotated by a driving member (not shown) via drive shaft 2. A laser oscillator 72 produces a laser beam which is modulated by a modulator 74. Modulator 74 is connected to a write and read control unit (not shown); this unit modulates the laser beam according to the signal output (e.g., video information and index information) from the control unit. An optical head 76 receives the modulated laser beam and projects it onto recording member 3 which rotates at a constant speed. Optical head 76 includes a galvanometer 80 which includes a pivotable mirror and a lens system 82 for focusing the beam onto the recording member 3. This mirror pivots to a sufficient extent to deflect the beam along the entire radius of recording member 3.

Recording member 3 includes a recording layer which is formed, for example, by depositing a Te layer on the upper surface of a plastic substrate forming an information recording area. When an incident light beam $l_1$ contacts a portion of the Te layer, that portion is vaporized according to the modulation of the light beam. As a result, a series of reflecting and transparent regions (i.e., information bits) are formed on the recording member according to the modulation. In this way, video information is recorded along a spiral record track on recording member 3.

When reading the information from the recording member, laser beam $l_2$, produced by oscillator 72, scans the recording member which rotates at a constant speed. This light is reflected from member 3 and is transmitted through optical head 76 and is directed to a reflector 84. Reflector 84 reflects the light onto a photoelectric converter 86, which converts the incident light to electrical analog signals. The signals from converter 86 are supplied to an analog-to-digital converter 87 which converts the analog signals into digital signals suitable for controlling the write and read control unit. A detector 88 is also connected to photoelectric converter 76 and produces a control signal corresponding to the deviation of laser beam $l_2$ from the center of the information bits stored on the spiral record track. Optimum reproduction performance requires that the reading beam contact the center of each information bit. Consequently, a galvanometer driver 89 is connected to detector 88 for controlling galvanometer 80 according to the control signal from detector 88. In this manner, the light beam is positioned to contact the center of each information bit.

A linear actuator 90 changes the radial position of optical head 76 along recording member 3 according to a control signal from a control circuit 94. Linear actuator 90 is provided with an optical scale 92 for detecting the radial position of optical head 76. Optical scale 92 supplies a position signal to control circuit 94 every time optical head 76 shifts to the next position. Control circuit 94 supplies control signals to a main control unit, laser oscillator 72, linear actuator 90 and a drive unit (not shown) for driving recording member 3.

Recording member 3 is rotated at a constant speed by a disc shaped turntable 1 which is rotated by a driving member (not shown) via drive shaft 2. The optical head 76 is positioned below the lower surface of disc unit 3 and adjacent the outer edge of disc unit 3.

Figure 2:
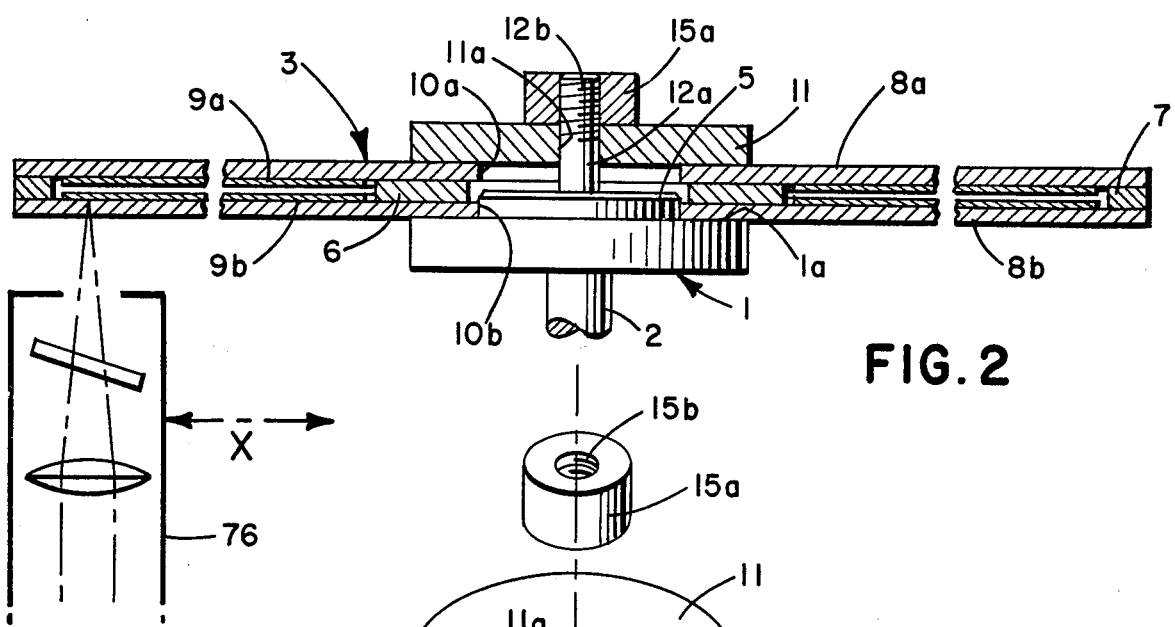
FIG. 2 is a vertical sectional view of a turntable and a disc unit shown in FIG. 1.
Figure 3:
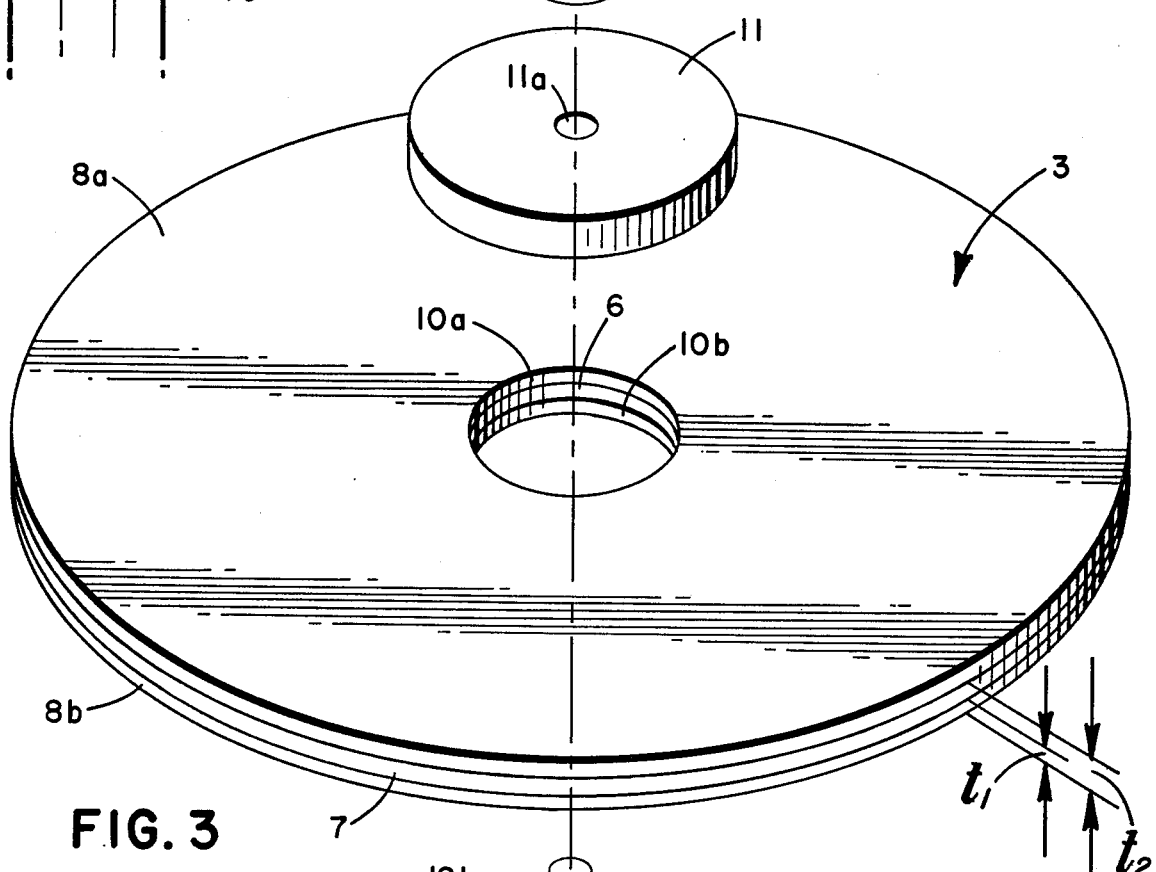
FIG. 3 is an exploded perspective view of the turntable and disc unit shown in FIG. 2.

Reference is now made to FIGS. 2 and 3. As shown, turntable 1 comprises a supporting surface 1a which includes a centrally located centering member 5. Centering member 5 has a disk-like shape such that its outer surface 5a engages the aperture 10b of a lower recording portion 8b. Centering member 5 supports, rotates and centers disc unit 3. Turntable 1 and centering member 5 are made of, for example, brass material. Recording member 3, as shown in FIG. 4, has a disc shape construction comprising two recording portions 8a and 8b which are spaced by concentric spacers 6, 7 and connected by adhesive.

Disc members 8a, 8b are made of an acryl material having approximately equal thickness. As shown in FIG. 4, each disc member 8a, 8b has the same outside diameter as concentric outer spacer 7. The inner surfaces of disc members 8a, 8b contain respective recording layers 9a, 9b of light-reflecting material such as Al or Te. Centrally located in each recording portion 8a, 8b are respective apertures 10a, 10b having the same inside diameter (see FIG. 2). Apertures 10a and 10b have approximately the same shape and size. Concentric inner spacer 6 (FIG. 4) is centrally located between recording portions 8a, 8b and contains an aperture having a slightly larger diameter than apertures 10a, 10b (see FIG. 2). The size and shape is such that the aperture of recording portion 8b can snugly engage the outer surface 5a of the centering member.

As shown in FIGS. 2-3, centering member 5 has a length $t'$ such that it enters aperture 10b in the lower recording portion but does not protrude into aperture 10a in the upper recording portion. As shown in FIGS. 2-4, the length of centering member 5 is $t'$, the length of each recording portion 8a, 8b is $t_1$, and the total length of each recording portion and spacers 6, 7 is $t_2$. The length of centering member 5 is designed so that $t' \leq t_2$. In fact, centering member 5 can be designed so that $t' > t_1$. In the example shown in the drawings, $t_1 = 1.5$ mm, $t_2 = 3.5$ mm and $t' = 2$ mm. Therefore, centering member 5 engages only one of the two recording portions 8a, 8b. As a result, the recording portion, located adjacent the optical head 76 and, upon which the recording and reproducing will occur, is accurately positioned and centered so that no eccentricity will occur during its rotation to produce inaccurate recording and reproduction. This is the case even if the position of apertures 10a, 10b are misaligned.

FIGS. 2-3 show the mounting of disc unit 3 on turntable 1. Turntable 1 is rotated at a constant speed by a driving member (not shown) via drive shaft 2. Centrally located on the turntable, above centering member 5, is a threaded spindle 12a having a threaded portion 12b. Threaded spindle 12a is utilized to securely mount disc unit 3 on turntable 1. After the recording portion 8b is positioned to engage centering member 5, a washer 11 with an aperture 11a is positioned on the protruding portion of spindle 12a. Washer 11 comprises a circular rubber washer. The outer diameter of washer 11 is larger than the diameter of apertures 10a and 10b, while the diameter of aperture 11a is smaller than the diameter of apertures 10a and 10b. In order to securely fasten disc unit 3 on turntable 1, a clamping nut 15a is utilized for pressing the unit against turntable 1. Nut 15a has a threaded portion 15b which is secured onto threads 12b of spindle 12a. As shown, clamping nut 15a has an outer diameter which is larger than the diameter of aperture 11a of washer 11. It should be clear that after recording or reproducing on all tracks of recording portion 8b, the drive unit can be turned over so that recording or reproducing will occur on recording portion 8a. Likewise, due to the design of the instant invention, any misalignment between apertures 10a and 10b will not produce eccentricity during the rotation of recording portion 8a. Since the centering member will engage aperture 10a but not aperture 10b of recording portion 8a, misalignment will have no affect on the accuracy of reproduction and recording.

Figure 5B:
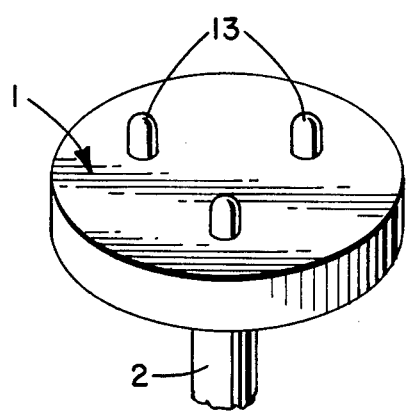
Figure 6B:
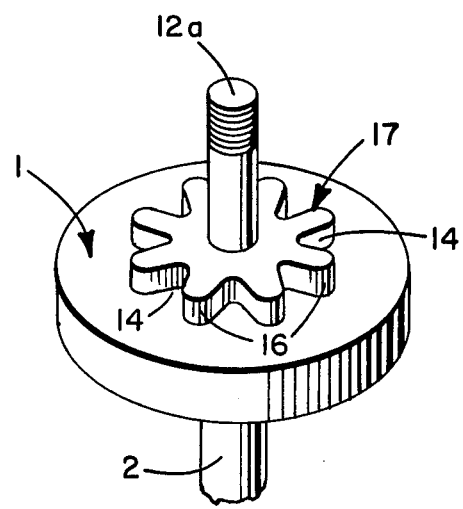

The shape of the centering member 5 is not limited to the embodiment shown in FIGS. 2–3. Alternatively, as shown in FIGS. 5a and 5b, the centering member can be provided with a plurality of pins 13. These pins will engage the surface of aperture 10a or 10b. Further, as shown in FIGS. 6a and 6b, a centering member 15 can be provided with a number of radially extending finger-like projections 16 having recessed portions 14. As shown, the ends of each projection 16 engage the surface of either 10a or 10b.

Since obvious changes may be made in the illustrated embodiment of the device without departing from the scope of the invention, it is intended that all matter contained herein be interpreted as illustrative only. For example, either recording portion 8a or 8b can be utilized to record and/or reproduce information.

I claim:

1. Apparatus for rotatably supporting a recording member having first and second spaced recording portions, said first and second recording portions each having a respective centrally located aperture;

said apparatus comprising a rotating means for rotatably supporting said first and said second recording portions, said rotating means including a centering means cooperating with the aperture of a selected one of said recording portions independent of the aperture of the other recording portion for centering said recording member on said rotating means, wherein said centering means has a length such that it enters the aperture in the selected one of said recording portions but does not protrude into the aperture of the other recording portion.

2. Apparatus for rotatably supporting a recording member as claimed in claim 1, further comprising a recording and reproducing means for supplying recording information signals to a recording layer on said first recording portion and for reading information signals from the recording layer on said first recording portion.

3. Apparatus for rotatably supporting a recording member as claimed in claim 2 wherein said recording and reproducing means includes an optical head which is positioned adjacent said first recording portion.

4. Apparatus for rotatably supporting a recording member as claimed in claim 1 wherein said recording member has an axis defined by the respective apertures of the first and second recording portions, said axis being vertically orientated by the rotating means.

5. Apparatus for rotatably supporting a recording member as claimed in claim 1 wherein said recording portions are spaced by two concentric spacers having equal length.

6. Apparatus for rotatably supporting a recording member as claimed in claim 4 wherein said first recording portion and said spacers have a length which is greater than the length of said centering means.

7. Apparatus for rotatably supporting a recording member as claimed in claim 1 wherein said centering means includes a centrally located spindle, said spindle having a length which projects through the respective apertures of said first and second recording portions, said spindle comprising means for securely fastening said recording member to said rotating means.

8. Apparatus for rotatably supporting a recording member as claimed in claim 1 wherein said centering means comprises a plurality of pins which engage the aperture of said first recording portion.

9. Apparatus for rotatably supporting a recording member as claimed in claim 1 wherein the centering means comprises radially extending finger-like projections, the ends of each projection engage the aperture of said first recording portion.

* * * * *